US011241624B2

(12) United States Patent
Bridge et al.

(10) Patent No.: US 11,241,624 B2
(45) Date of Patent: Feb. 8, 2022

(54) LOCATION-BASED VIDEO GAMING WITH ANCHOR POINTS

(71) Applicants: Joshua Alexander Bridge, Santa Monica, CA (US); Robert Frederick Ford, Novato, CA (US); Eunice Lee, Santa Monica, CA (US); Nathan Lutz, Los Angeles, CA (US); Michal Tadeusz Madej, Irvine, CA (US); Paul Reiche, III, Novato, CA (US)

(72) Inventors: Joshua Alexander Bridge, Santa Monica, CA (US); Robert Frederick Ford, Novato, CA (US); Eunice Lee, Santa Monica, CA (US); Nathan Lutz, Los Angeles, CA (US); Michal Tadeusz Madej, Irvine, CA (US); Paul Reiche, III, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 37 days.

(21) Appl. No.: 16/723,409

(22) Filed: Dec. 20, 2019

(65) Prior Publication Data
US 2020/0206629 A1 Jul. 2, 2020

Related U.S. Application Data

(60) Provisional application No. 62/785,148, filed on Dec. 26, 2018.

(51) Int. Cl.
*A63F 13/65* (2014.01)
*A63F 13/216* (2014.01)

(52) U.S. Cl.
CPC ............ *A63F 13/65* (2014.09); *A63F 13/216* (2014.09)

(58) Field of Classification Search
None
See application file for complete search history.

(56) References Cited

U.S. PATENT DOCUMENTS

| | | | |
|---|---|---|---|
| 8,287,383 B1* | 10/2012 | Etter | A63F 13/85 463/42 |
| 9,669,296 B1* | 6/2017 | Hibbert | A63F 13/61 |
| 9,710,554 B2* | 7/2017 | Sandberg | G06F 3/147 |
| 9,782,668 B1* | 10/2017 | Golden | A63F 13/216 |
| 10,252,167 B2 | 4/2019 | Kruglick | |
| 10,839,218 B2* | 11/2020 | Nakamura | A63F 13/5378 |
| 2002/0090985 A1* | 7/2002 | Tochner | A63F 13/655 463/1 |
| 2005/0009608 A1* | 1/2005 | Robarts | A63F 13/355 463/42 |
| 2009/0005140 A1* | 1/2009 | Rose | A63F 13/12 463/7 |
| 2010/0002122 A1* | 1/2010 | Larson | H04N 5/232935 348/333.01 |
| 2010/0287011 A1* | 11/2010 | Muchkaev | A63F 13/216 379/93.13 |

(Continued)

*Primary Examiner* — Tramar Harper
(74) *Attorney, Agent, or Firm* — Klein, O'Neill & Singh, LLP

(57) ABSTRACT

A mobile video game uses real world anchor points in providing for video game play which includes virtual elements. The real world anchor points may be specified in terms of a geographic coordinate system, and game play may be based on mobile device presence at or about the anchor points.

9 Claims, 8 Drawing Sheets

(56) References Cited

U.S. PATENT DOCUMENTS

| | | | |
|---|---|---|---|
| 2011/0279445 A1* | 11/2011 | Murphy | G06F 3/04842 345/419 |
| 2012/0129590 A1* | 5/2012 | Morrisroe | A63F 13/65 463/25 |
| 2012/0166074 A1* | 6/2012 | Weng | G01C 21/32 701/409 |
| 2012/0290591 A1* | 11/2012 | Flynn | G06F 16/5866 707/754 |
| 2013/0072308 A1* | 3/2013 | Peck | A63F 13/216 463/42 |
| 2013/0178257 A1* | 7/2013 | Langseth | A63F 13/812 463/4 |
| 2013/0278636 A1* | 10/2013 | Ota | G06T 19/006 345/633 |
| 2013/0307875 A1* | 11/2013 | Anderson | G06T 19/006 345/633 |
| 2014/0015858 A1* | 1/2014 | Chiu | G09G 5/026 345/633 |
| 2014/0125699 A1* | 5/2014 | Lotto | G06T 19/006 345/633 |
| 2015/0091941 A1* | 4/2015 | Das | G06F 3/017 345/633 |
| 2016/0093106 A1* | 3/2016 | Black | G06K 9/6201 345/633 |
| 2016/0171238 A1* | 6/2016 | Sibillo | H04W 4/029 713/164 |
| 2018/0082117 A1* | 3/2018 | Sharma | G06T 19/006 |
| 2018/0082475 A1* | 3/2018 | Sharma | G06F 3/147 |
| 2018/0345147 A1* | 12/2018 | Okajima | A63F 13/52 |
| 2019/0019337 A1* | 1/2019 | Monsarrat | G06Q 50/01 |
| 2019/0022530 A1* | 1/2019 | Kornmann | G07F 17/32 |
| 2019/0088030 A1* | 3/2019 | Masterson | G01S 19/01 |
| 2019/0282903 A1* | 9/2019 | Brody | A63F 13/5375 |
| 2019/0320113 A1* | 10/2019 | Rajvanshi | G06K 9/00664 |
| 2019/0355050 A1* | 11/2019 | Geisler | G06T 19/006 |
| 2020/0108309 A1* | 4/2020 | Kidera | A63F 13/332 |
| 2020/0391104 A1* | 12/2020 | Nakamura | G09B 29/00 |

* cited by examiner

LOCATION-BASED VIDEO GAMING WITH ANCHOR POINTS

CROSS REFERENCE TO RELATED APPLICATION

This application claims the benefit of the filing date of U.S. Provisional Patent Application No. 62/785,148, filed on Dec. 26, 2018, the disclosure of which is incorporated by reference herein.

BACKGROUND OF THE INVENTION

The present invention relates generally to video games, and more particularly to mobile real world location-based video games.

Video games provide a source of entertainment for many. Video games often provide an interactive activity that can be interesting and challenging, and may allow game players to engage in simulated activities that may otherwise be unavailable. Unfortunately, play of video games may lack interaction with the broader physical world, particularly for video game play centered about a large and generally immobile specialized video game device.

BRIEF SUMMARY OF THE INVENTION

In some embodiments a mobile video game uses real world anchor points in providing for video game play which includes virtual elements. The real world anchor points may be specified in terms of a geographic coordinate system, and game play may be based on mobile device presence at or about the anchor points. In some embodiments the anchor points may be predefined for game play, in some embodiments game players may add anchor points, and in some embodiments specify virtual elements for game play at those anchor points. In various embodiments a mobile device at the anchor points may display virtual elements, either in a virtual world dependent on location of the anchor points and/or in conjunction with real world elements at the location.

Some embodiments in accordance with aspects of the invention provide a method for a mobile video game, comprising: determining if a first mobile computing device is at a predetermined location; determining at least one virtual element associated with a predetermined direction of view from the predetermined location; in response to determining that the first mobile computing device as at the predetermined location, providing information for display by the first mobile computing device of the at least one virtual element in conjunction with real world elements of an image of a scene in the predetermined direction of view from the predetermined location; providing for virtual engagement with the at least one virtual element or the real world elements.

In some embodiments the predetermined location is determined by a second mobile computing device, with the second mobile computing device indicating selection of a location at which the second mobile computing device is present. In some embodiments the predetermined direction of view is determined based on a direction of view indicated by an image captured by the second mobile computing at the second location. In some embodiments the virtual element is provided by the second mobile device. In some embodiments the virtual engagement is based on a selection provided by the second mobile computing device.

In some embodiments the virtual engagement comprises collecting the at least one virtual element. In some embodiments the virtual engagement comprises depositing a virtual item at the predetermined location. In some embodiments the virtual item is a collectible item. In some embodiments the virtual item is a displayable item. In some embodiments the virtual item is virtual artwork on a real world element. In some embodiments the virtual engagement comprises play of a virtual game using the first mobile computing device.

In some embodiments the method further comprises: determining if the first mobile computing device is at a location near the predetermined location and has a direction of view such that an image taken by the first mobile computing device would be expected to include at least some of the real world elements of the image of the scene in the predetermined direction of view from the predetermined location; receiving an indication of a selection of the location; and storing the location as a further predetermined location associated with the predetermined location.

These and other aspects of the invention are more fully comprehended upon review of this disclosure.

DETAILED DESCRIPTION

A mobile computing device such as a smartphone may be used for a location-based video game. The video game uses real world anchor points in providing for game play including virtual elements. The real world anchor points may be specified in terms of a geographic coordinate system, and game play may be based on GPS circuitry of the smartphone indicating that the smartphone is located at or about the anchor points. The anchor points may be predefined for game play, and in some embodiments game players may add anchor points as part of game play. In various embodiments virtual elements may be associated with the anchor points. In some embodiments the virtual elements may be viewed as part of an image of a scene taken from the anchor point. In some embodiments game players may create, modify, or otherwise engage in game play with the virtual elements, as part of game play.

Figure 1:
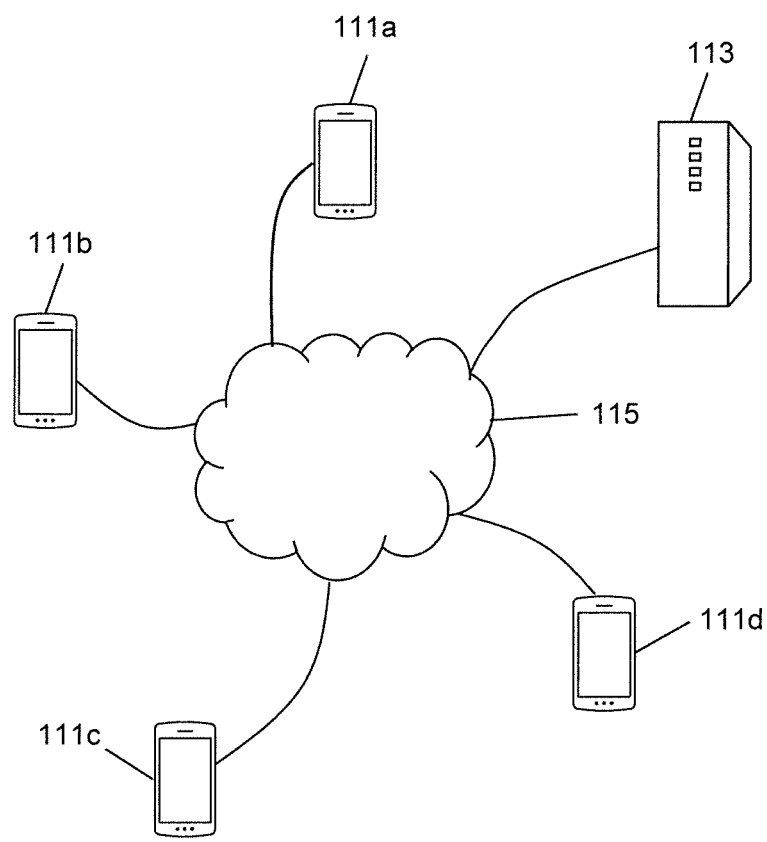
FIG. 1 illustrates a networked video game system in accordance with aspects of the invention.

FIG. 1 is a semi-block diagram of a system in accordance with aspects of the invention. The system includes a plurality of game devices 111a-d coupled to each other and a server 113 over a network 115, which may be for example the Internet.

The server generally includes one or more processors configured by program instructions, and has associated memory. The server stores information regarding anchor points. For example, the server may store locations of anchor points, information as to virtual elements associated with the anchor points, and other information. The program instructions include program instructions for providing, over the network, at least some of the information regarding anchor points to the game devices.

The game devices 111a-d are shown as a smartphone, including at least one processor, a display device, and a touchscreen. The game devices also include position determination circuitry, for example GPS circuitry, for determining position of the game devices, as well as imaging circuitry, for example a camera. In many embodiments the game devices also include circuitry for determining orientation of the game device, either in three dimensions or two dimensions (for example north-south-east-west) in various embodiments. For purposes of illustration, only a small number of game devices are shown in FIG. 1, in most embodiments the number of game devices may be much greater, over a thousand in some embodiments, and may be an order of magnitude or orders of magnitude greater than that. In addition, while only smartphones are displayed as game devices in FIG. 1, in some embodiments the game devices may be in the form of tablet computers or other compute devices having position determination circuitry, or access to information of position determination circuitry.

The game devices are configured, for example by program instructions, for play of a video game. In some embodiments during game play the game devices request information regarding anchor points from the server, engage in game play while located at anchor points, and provide the server game play status information. In some embodiments the game devices may create new anchor points as part of engaging in game play. In some embodiments the game devices request information regarding anchor points near a location of the game device, provide an indication to game players using the game devices when the game devices are at a particular anchor point, receive information regarding virtual elements associated with the particular anchor point, and provide a display of a scene viewed from the anchor point along with at least one virtual element associated with the particular anchor point.

In various embodiments the game devices may provide for game play including the virtual elements. In some embodiments the game play comprises modifying an appearance or location of the virtual element. For example, if the virtual element is a visual banner, in some embodiments the game play comprises modifying visual aspects of the banner, for example text on the banner. Also for example, if the virtual element is an item of virtual furniture, in some embodiments the game play comprises moving the item of virtual furniture, or replacing it with another item of virtual furniture. In some embodiments the game play comprises interactions with a virtual character, for example displayed in the scene. In some such embodiments, input devices of the game device may be manipulated by the game player so as to control a virtual item or character so as to do battle or otherwise engage in activities with the virtual character. In some such embodiments the input devices of the game device may be manipulated by way of manipulation of the game device itself, for example so as to change orientation of the game device in direction or space, with such changes indicated by game device orientation circuitry. In some embodiments the game play comprises collection of the virtual items.

Figure 2:
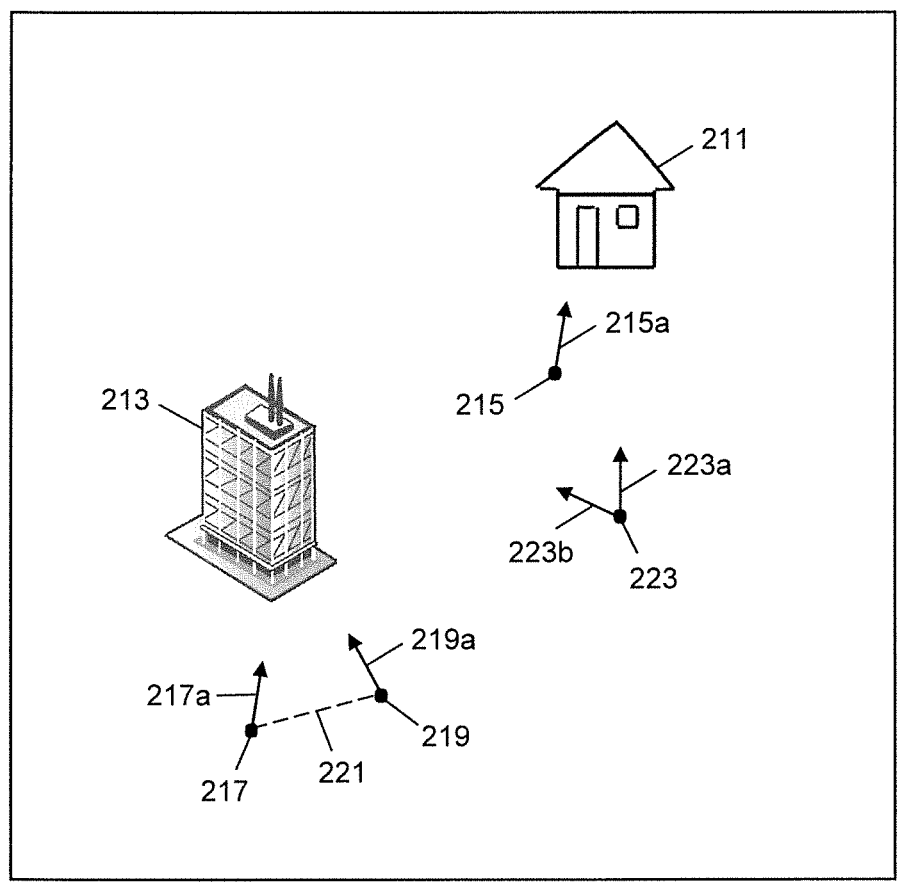
FIG. 2 diagrammatically illustrates a map with anchor points, in accordance with aspects of the invention.

FIG. 2 diagrammatically illustrates a map with anchor points, in accordance with aspects of the invention. The map includes a first building, in the form of a house 211. The map also includes a second building, in the form of a small skyscraper 213. A first anchor point 215 is located generally near the house. A first view direction 215a is associated with the first anchor point, with the first view direction being from the first anchor point and in the direction of the house. A smartphone located at the first anchor point, with an imaging device of smartphone directed in the first view direction, would be able to view a scene of the house on a display device of the smartphone. For game play, a virtual element may be displayed in the scene of the house. For example, a banner may be displayed over the house, or items or virtual characters may be displayed about the house. These virtual items may be considered as associated with the first anchor point, as they may be able to be viewed using the smartphone when the smartphone is located at the anchor point. Considering that the smartphone may be used to view the virtual items, the smartphone display may, in some embodiments, be considered to provide a porthole into viewing of a world comprised of real and virtual elements.

A second anchor point 217 is located generally near the skyscraper. As with the first anchor point, a second view direction 217a is associated with the second anchor point, with the second view direction being from the second anchor point and in the direction of the skyscraper. Also as with the first anchor point, a smartphone located at the second anchor point may be able to provide an image of a scene of the skyscraper on a display device of the smartphone, with a virtual element displayed in the scene for game play. A third anchor point 219 is also located generally near the skyscraper, with a third view direction being from the third anchor point and in the direction of the skyscraper. In some embodiments, the third anchor point may have a link 221 with the second anchor point, such that virtual elements associated with the second anchor point are also associated with the third anchor point, and vice versa. Such linkages of anchor points may be useful in various embodiments, for example to allow for larger virtual play spaces during game play.

A fourth anchor point 223 has multiple associated view directions. In FIG. 2, the multiple associated view directions include a fourth view direction, from the fourth anchor point and in the direction of the house, and a fifth view direction, from the fourth anchor point and in the direction of the skyscraper. Further, in some embodiments there may be more than two view directions associated with the fourth anchor point. In some embodiments virtual elements associated with the fourth anchor point may be viewable in a scene including either the house or the skyscraper. In other embodiments, however, various of the virtual elements associated with the fourth anchor point may only be associated with differing ones of the plurality of view directions. For example, a virtual banner may be associated with the direction towards the skyscraper, but not the direction towards the house, while a virtual character may be associated with the direction towards the house, but not the direction towards the skyscraper.

Figure 3A:
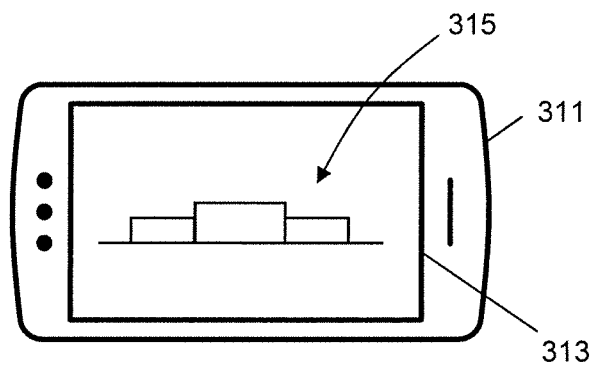
FIG. 3A shows a mobile computing device in the form of a smartphone displaying an image of a scene from an anchor point, or what will become an anchor point, in accordance with aspects of the invention.

FIG. 3A shows a mobile computing device in the form of a smartphone 311 displaying an image of a scene from an anchor point, or what will become an anchor point, in accordance with aspects of the invention. The smartphone may be one of the game devices of FIG. 1. A display 313 of the smartphone displays in image of a scene including a building complex 315. In some embodiments a game player may, using input devices of the smartphone, select the location of the smartphone as an anchor point, with a direction of view towards the building complex.

Figure 3B:
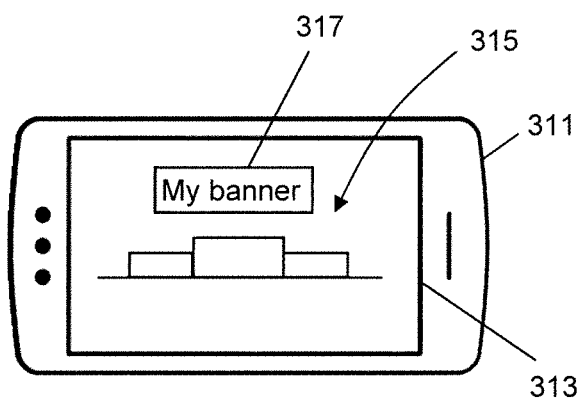
FIG. 3B shows the smartphone displaying the image of the scene from the anchor point of FIG. 3A along with a virtual element, in accordance with aspects of the invention.

FIG. 3B shows the smartphone 311 displaying the image of the scene from the anchor point of FIG. 3A along with a virtual element, in accordance with aspects of the invention. As with FIG. 3A, the scene displayed on the display 313 of the smartphone includes the building complex 315. In addition, the displayed scene additionally includes a virtual banner 317 over the building complex. The virtual banner may be selected or devised by the game player, using the inputs of the smartphone. Subsequently, other game players viewing the building complex from the anchor point, using their own game devices, may also see both the real world building complex, using an image capture device of the game device, and the virtual banner on the display of those game devices. Moreover, in various embodiments the other game players may modify the banner, or otherwise add or modify virtual elements associated with the anchor point and the view of the building complex. In some embodiments there may be limitations on who may make such additions or modifications, or game players may be required to undertake or complete various game play tasks prior to being allowed to make such additions or modifications.

Figure 4:
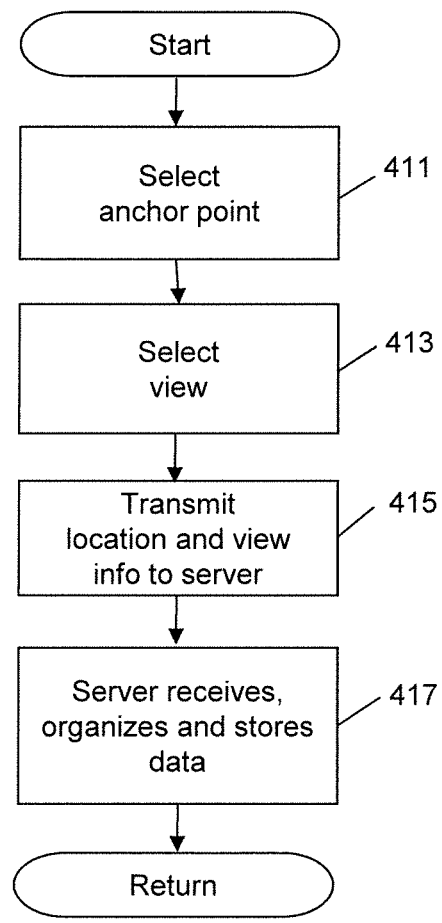
FIG. 4 is a flow diagram of a process for creating an anchor point, in accordance with aspects of the invention.

FIG. 4 is a flow diagram of a process for creating an anchor point, in accordance with aspects of the invention. In some embodiments the process is performed by a system, such as the system of FIG. 1. In some embodiments the process is performed by a server and a game device, for example the server of FIG. 1 and one of the game devices of FIG. 1. In some embodiments part of the process is performed by a game device, for example one of the game devices of FIG. 1. In some embodiments the process is performed by one or more processors, for example configured by program instructions.

In block 411 the process selects an anchor point. In some embodiments the process selects the anchor point by receiving an input to the game device indicating selection of a present location of the game device as the anchor point. In some embodiments the process selects the anchor point by receiving an input to the game device indicating selection of an image taken by the game device, with the information associated with the image indicating a location at which the image was taken. In such embodiments, the anchor point may be the location at which the image was taken.

In block 413 the process selects a view from the anchor point. In some embodiments the process selects the view from the anchor point by receiving an input to the game device indicating selection of a present orientation of the game device as indicating a view direction. In some embodiments the process selects the view from the anchor point by receiving an input to the game device indicating selection of an image taken by the game device, with the information associated with the image indicating an orientation at which the image was taken. In such embodiments, the view direction may be the orientation at which the image was taken. In some embodiments the operations of blocks 411 and 413 are combined, for example with the process receiving the selection of the image taken by the game device as indicating selection of the anchor point and the view from the anchor point.

In block 415 the process provides information as to the location of the anchor point, and view direction in some embodiments, to the server. In some embodiments the game device transmits the information to the server over a network, which may include various network elements such as cell phone related networks, fiber optic networks, all of which combined may be simply considered the Internet.

In some embodiments the process may also provide information regarding one or more virtual elements to be associated with the anchor point.

In block 417 the server receives, organizes, and stores the information regarding the anchor point. In some embodiments the server maintains the information regarding anchor points in a database, which may for example include information as to location of anchor points, view directions from anchor points, virtual elements associated with anchor points, information indicating game play program instructions for interactive video game play associated with anchor points, game players and/or game devices allowed to view, interact with, or generally engage in game play with the virtual elements at the anchor points, and possibly other information.

The process thereafter returns.

Figure 5:
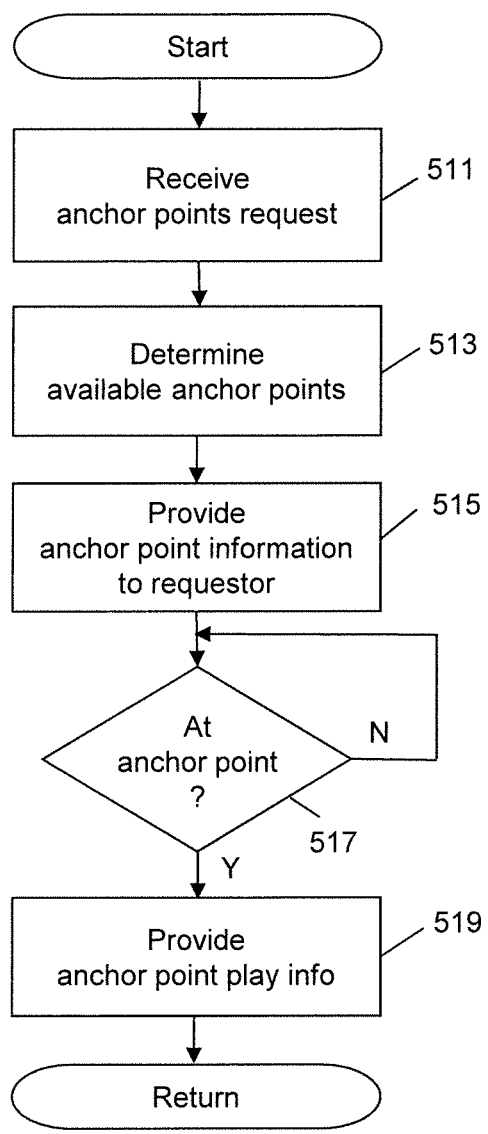
FIG. 5 is a flow diagram of a process for synchronizing a mobile computing device with an anchor point, in accordance with aspects of the invention.

FIG. 5 is a flow diagram of a process for synchronizing a mobile computing device, for example a game device, with an anchor point, in accordance with aspects of the invention. In some embodiments the process is performed by a system, such as the system of FIG. 1. In some embodiments the process, or part of the process, is performed by a server, for example the server of FIG. 1. In some embodiments the process is performed by a server and a game device, for example the server of FIG. 1 and one of the game devices of FIG. 1. In some embodiments the process is performed by one or more processors, for example configured by program instructions.

In block 511 the process receives a request for anchor points. In some embodiments the request is received by the server. In some embodiments the request indicates a location of a game device making the request. In some embodiments the request additionally indicates a game device or a game player associated with the game device making the request. In some embodiments the request additionally indicates a radial distance from the location of the game device for which anchor points are requested.

In block 513 the process determines available anchor points. In some embodiments the process determines available anchor points based on one, some or all of location of the requesting game device, locations of anchor points, distance between the requesting game device and locations of anchor points, and/or identity of the requesting game device or a game player associated with the requesting game device.

In block 515 the process provides anchor point information to the requesting game device. In some embodiments the anchor point information is anchor point information for the available anchor points determined in block 513. In some embodiments the anchor point information includes information for only a single anchor point. In some embodiments the anchor point information includes information for a plurality of anchor points. In some embodiments the anchor point information includes a location of the anchor point. In some embodiments the anchor point information includes the location of the anchor point and a view direction associated with the anchor point.

In block 517 the process determines if the game device is located at an anchor point. In some embodiments the process determines the game device is at the anchor point based on receiving a notification that the game device is at the anchor point. In some embodiments the game device, utilizing GPS circuitry of the game device, determines a location of the game device, whether the game device is at the anchor point, and provides a notification to the server that the game device is at the anchor point in response to determining that the game device is at the anchor point. In some embodiments the game device includes program instructions for providing an indication of relative position between the game device and the anchor point, to assist a game player in reaching the anchor point with the game device. In some embodiments the game device provides an indication of position of the game device to the server, and the server provides the game device the indication of relative position between the game device and the anchor point. In some embodiments the process additionally determines if the game device is oriented such that an image capture device of the game device, or simply the game device, is oriented in a direction of view associated with the anchor point.

In block 519 the process provides game play information to the game device, in some embodiments responsive to the game device being located at the anchor point. In some embodiments the server provides virtual element information associated with the anchor point to the game device. In some embodiments the virtual element information comprises information for display of a virtual item on a display of the game device, in some embodiments in conjunction with display of a scene captured by an image capture device of the game device. In some embodiments the virtual element information includes information for game device game play involving virtual items. In some embodiments the information for game device game play involving virtual items comprises program instructions. In some embodiments the information for game device game play involving virtual items comprises data to be operated on by game play program instructions already resident on the game device.

The process thereafter returns.

Figure 6:
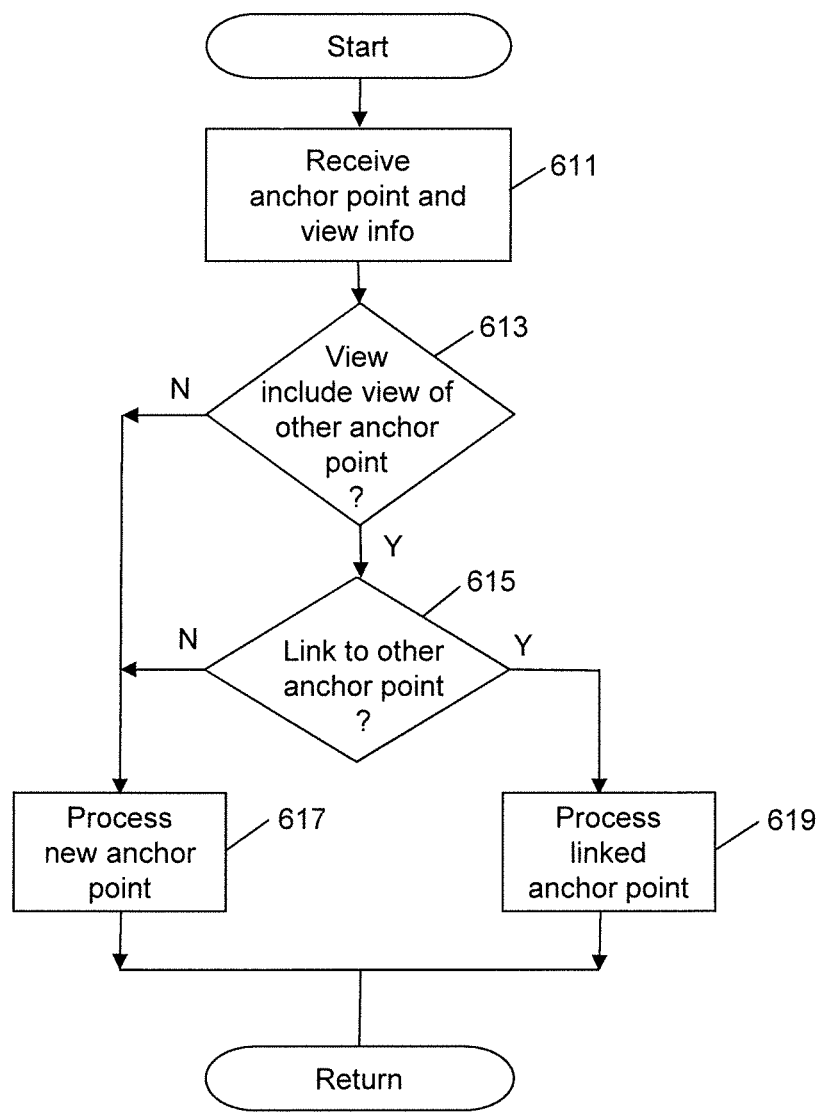
FIG. 6 is a flow diagram of a process for processing an anchor point, in accordance with aspects of the invention.

FIG. 6 is a flow diagram of a process for processing an anchor point, in accordance with aspects of the invention. In some embodiments the process is performed by a system, such as the system of FIG. 1. In some embodiments the process, or part of the process, is performed by a server, for example the server of FIG. 1. In some embodiments the process is performed by a server and a game device, for example the server of FIG. 1 and one of the game devices of FIG. 1. In some embodiments part of the process is performed by a game device, for example one of the game devices of FIG. 1. In some embodiments the process is performed by one or more processors, for example configured by program instructions.

In block 611 the process receives anchor point location and, in some embodiments, view direction information. In some embodiments the server may also receive information of a virtual element associated with the anchor point.

In block 613 the process determines if a view from the anchor point in the direction of the view includes a view from another nearby anchor point. If so, in block 615 the process determines if the anchor point should be linked to the other nearby anchor point, as for example the views from the anchor points may be of the same general structure or thing, and with both provided by the same game player or game players who have some association. If the anchor point view does not include a view from another nearby anchor point, or if the anchor points should not be linked, the process proceeds to block 617, otherwise the process proceeds to block 619.

In block 617 the process performs processing for a new anchor point. In some embodiments the operations of block 617 include the operations of block 417 of the process of FIG. 4. In some embodiments the server creates records for the new anchor point, for example records indicating location of the anchor point and some or all of view direction for the anchor point, virtual elements associated with the anchor point, accessibility of information regarding the anchor point, and possibly other information. In block 619 the process links information of the new anchor point, for example location and possibly view direction, with the other nearby anchor point to which the new anchor point should be linked.

The process thereafter returns.

Figure 7:
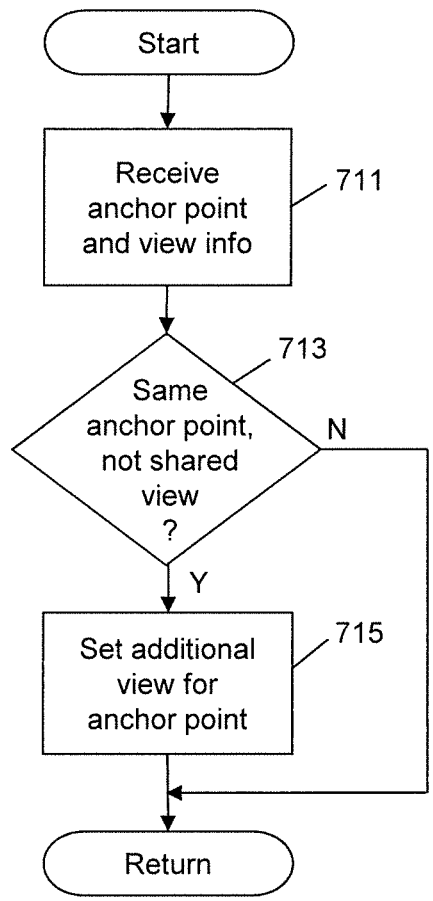
FIG. 7 is a flow diagram of a further process for processing an anchor point, in accordance with aspects of the invention.

FIG. 7 is a flow diagram of a further process for processing an anchor point, in accordance with aspects of the invention. In some embodiments the process, or part of the process, is performed by a server, for example the server of FIG. 1. In some embodiments the process is performed by a server and a game device, for example the server of FIG. 1 and one of the game devices of FIG. 1. In some embodiments the process is performed by one or more processors, for example configured by program instructions.

In block 711 the process receives anchor point location and, in some embodiments, view direction information. In some embodiments the server receives the information, for example as provided by a game device.

In block 713 the process determines if the anchor point location information matches location information of a pre-existing anchor point, but does not share a same view direction. If so, the process proceeds to block 715, otherwise the process returns. In block 715 the process sets an additional view direction for the pre-existing anchor point, and thereafter returns.

Figure 8:
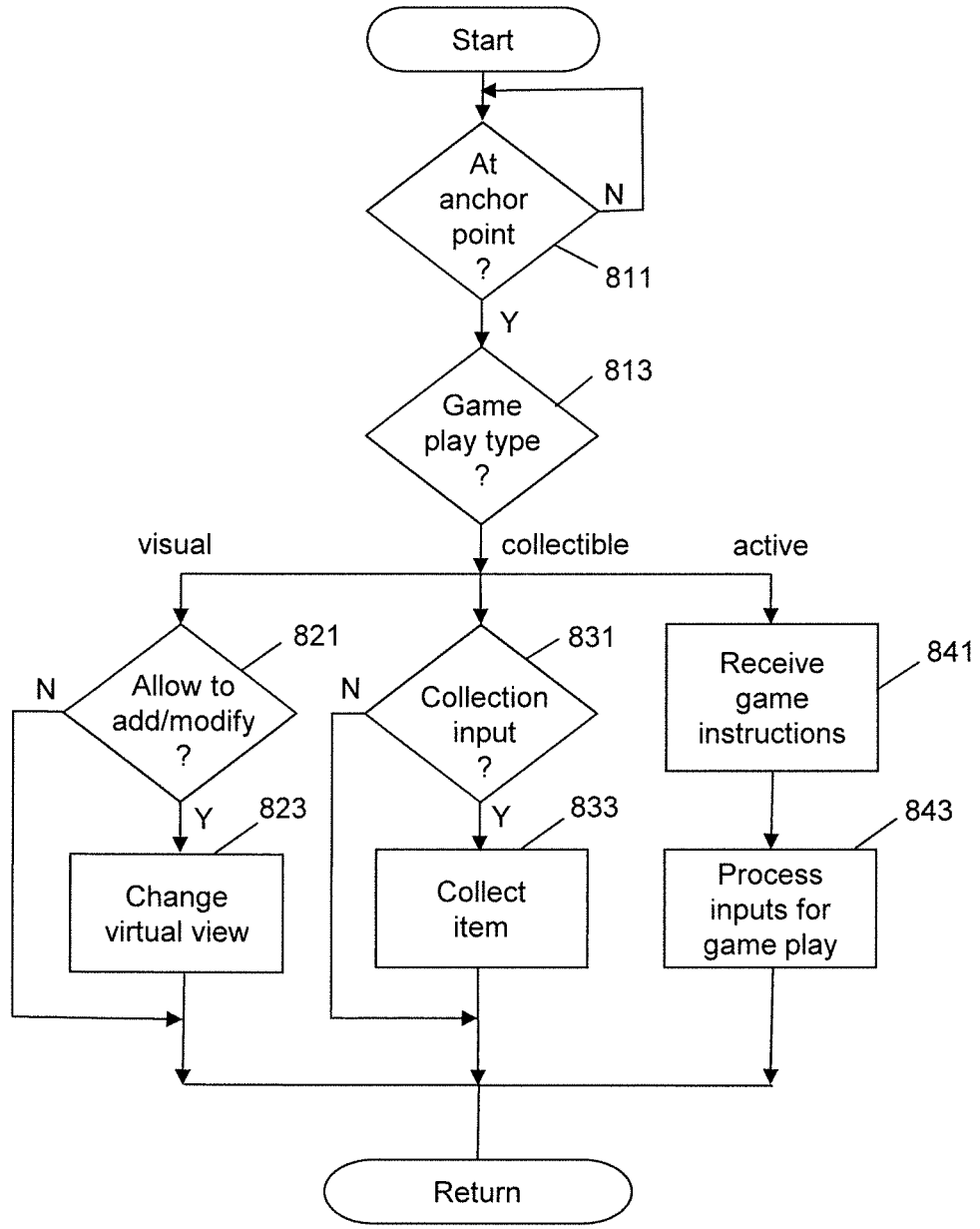
FIG. 8 is a flow diagram of a process for providing for game play relating to an anchor point, in accordance with aspects of the invention.

FIG. 8 is a flow diagram of a process for providing for game play relating to an anchor point, in accordance with aspects of the invention. In some embodiments the process, or part of the process, is performed by a game device, for example one of the game devices of FIG. 1. In some embodiments the process is performed by a server and a game device, for example the server of FIG. 1 and one of the game devices of FIG. 1. In some embodiments the process is performed by one or more processors, for example configured by program instructions.

In block 811 the process determines if the game device is at a location of an anchor point. In some embodiments the game device determines its location using GPS circuitry of the game device, and compares that location with a location of an anchor point, for example provided by the server. If the game device is at the location of an anchor point, the process continues to block 813.

In block 813 the process determines a type of game play to conduct at the anchor point. In some embodiments the determination may be implicitly made. In some embodiments the type of game play may one, some, or all of a visual type of game play, a collectible type of game play, and/or an active type of game play. In some embodiments the type of game play available is dependent on a nature of virtual elements associated with the anchor point. For a visual type of game play, the process proceeds to block 821. For a collectible type of game play, the process proceeds to block 831. For an active type of game play, the process proceeds to block 841.

For a visual type of game play, in block 821 the process determines if the game device, or a game player associated with the game device, is allowed to modify virtual elements of scene viewed from the anchor point. For example, the anchor point may have a virtual banner with text visible in the scene, as displayed on the game device. In various embodiments only predetermined individuals, or individuals with a predetermined game score, or individuals who have achieved a predetermined game accomplishment may be allowed to modify the text of the virtual banner, or other visual aspect of the virtual banner. If the game device or game player is not allowed to modify virtual elements of the scene, the process returns. Otherwise the process continues to block 823.

In block 823 the process changes virtual elements of the scene viewed from the anchor point. In some embodiments the process receives an input or inputs to the game device requesting a change. For example, new text for a virtual banner may be entered into the game device, a different color selected for the banner, new artwork may be drawn on a touchscreen of the game device, or various other inputs to the game device may be made requesting changes to or additions of virtual elements of the scene as viewable through use of the display of the game device. The process thereafter returns.

For a collectible type of game play, in block 831 the process determines if the game device has received an input indicating a request to collect a virtual item at or about the anchor point. If an input indicating a request to collect the virtual item has been made, the virtual item is collected in block 833. In some embodiments collection of the virtual item comprises providing an indication from the game device to the server that the virtual item has been collected by the game device, or game player associated with the game device, with the server storing an indication that the game player has collected the virtual item. In some embodiments the game player, using the game device may subsequently deposit the virtual item at another anchor point, already existing in some embodiments or newly made by the game player, using the game device, in some embodiments.

For an active type of game play, in block 841 the process receives program instructions for execution on a processor of the game device to provide for game play. In some embodiments the program instructions may be provided by a server, for example responsive to the game device being located at the anchor point. In some embodiments the program instructions, or some of them, may already be resident on the game device prior to the game device being located at the anchor point, but executed or able to be executed on request once the game device is located at the anchor point.

In block 843 the process processes user inputs for game play. In some embodiments the user inputs are provided by manipulation of user input devices of the game device. In some embodiments the user inputs are instead or in addition provided by the game player changing orientation of the game device. In some embodiments the user inputs are used to control a tool or game character associated with the game player with respect to virtual items or other characters provided as part of game play. In some embodiments the game play occurs in a virtual world of game play, the virtual world including virtual elements associated with the anchor point in some embodiments. In some embodiments the game play occurs in a scene captured by an imaging device of the game device, with the scene further including virtual elements.

Although the invention has been discussed with respect to various embodiments, it should be recognized that the invention comprises the novel and non-obvious claims supported by this disclosure.

What is claimed is:

1. A method for a mobile video game, comprising:
receiving a selection of a first location and a selection of a first direction of view from a first mobile computing device;
determining if the first mobile computing device is at a second location near the first location and has a direction of view such that an image taken by the first mobile computing device would be expected to include at least some real world elements of an image of the scene in the first direction of view from the first location; and
receiving an indication of a selection of the second location; and
storing the second location as a location associated with the first location;
determining if a second mobile computing device is at the first or second location;
determining at least one virtual element associated with a predetermined direction of view from the first or second location;
in response to determining that the second mobile computing device is at the first or second location, providing information for display by the second mobile computing device of the at least one virtual element in conjunction with real world elements of an image of a scene in the predetermined direction of view from the first or second location; and
providing for virtual engagement with the at least one virtual element or the real world elements.

2. The method of claim 1, wherein the virtual element is provided by the first mobile device.

3. The method of claim 1, wherein the virtual engagement comprises collecting the at least one virtual element.

4. The method of claim 1, wherein the virtual engagement comprises depositing a virtual item at the predetermined location.

5. The method of claim 4, wherein the virtual item is a collectible item.

6. The method of claim 4, wherein the virtual item is a displayable item.

7. The method of claim 4, wherein the virtual item is virtual artwork on a real world element.

8. The method of claim 1, wherein the virtual engagement comprises play of a virtual game using the second mobile computing device.

9. The method of claim 1, wherein the virtual engagement is based on a selection provided by the first mobile computing device.

* * * * *